United States Patent [19]

Gladstein et al.

[11] 4,208,595
[45] Jun. 17, 1980

[54] SUBSTRATE GENERATOR

[75] Inventors: Leo A. Gladstein, Tucson, Ariz.; Robert D. Love, Kingston, N.Y.; Larry C. Martin, Tucson, Ariz.

[73] Assignee: International Business Machines Corporation, Armonk, N.Y.

[21] Appl. No.: 954,946

[22] Filed: Oct. 24, 1978

[51] Int. Cl.² .......................................... H03K 1/02
[52] U.S. Cl. ............................ 307/297; 307/200 B; 307/304; 307/DIG. 1; 307/DIG. 4
[58] Field of Search ................. 307/297, 304, DIG. 4, 307/296, 246, 200 B, DIG. 1; 328/176; 363/59, 60

[56] References Cited

U.S. PATENT DOCUMENTS

| T954,006 | 1/1977 | Lee et al. .................. 307/304 X |
| 3,609,414 | 9/1971 | Pleshko .................... 307/304 X |
| 3,790,812 | 2/1974 | Fry .......................... 307/246 X |
| 3,794,862 | 2/1974 | Jenne ....................... 307/304 |
| 3,806,741 | 4/1974 | Smith ....................... 307/304 |
| 3,956,714 | 5/1976 | Lüscher ..................... 307/DIG. 4 |
| 4,016,476 | 4/1977 | Morokawa et al. ........ 307/304 X |
| 4,049,980 | 9/1977 | Maitland ................... 307/297 X |
| 4,115,710 | 9/1978 | Lou .......................... 307/297 X |
| 4,123,671 | 10/1978 | Aihara et al. ............. 307/DIG. 1 X |
| 4,142,114 | 2/1979 | Green ....................... 307/297 X |

OTHER PUBLICATIONS

Jensen, "Substrate Voltage Generator Circuit," *IBM Tech. Discl. Bull.*, vol. 21, No. 2, pp. 727–728, Jul. 1978.
Kubo et al., 1976 *IEEE Int'l Solid-State Circuits Conference,* (Digest of Technical Papers); "Session VI, MOS Techniques," pp. 54–55, Feb. 18, 1976.
Hummel, "Sentry Circuit for Substrate Voltage Control," *IBM Tech. Discl. Bull.*, vol. 15, No. 2, pp. 478–479, Jul. 1972.
*Electronics,* (pub.), "Fast MOSTEK ROM has 350-ns Access," pp. 42–43, Sep. 16, 1976.

*Primary Examiner*—Larry N. Anagnos
*Attorney, Agent, or Firm*—John E. Hoel

[57] ABSTRACT

An FET substrate voltage generator circuit is disclosed for converting a single power supply and ground potential to a negative potential having an absolute value whose magnitude is greater than the power supply potential and applying that potential to the substrate of an integrated circuit upon which it is formed. The circuit dissipates less power per unit of current supplied by the circuit and occupies less space than do prior art circuits. The circuit applies the principle of voltage doubling to a first capacitor to achieve the desired voltage magnitude across a second capacitor and then applies the principle of a.c. coupling to that second capacitor connected through an impedance to the first capacitor, to achieve the desired polarity inversion for the substrate voltage to be generated. This circuit provides the current generating capacity necessary to drive the substrate to a negative voltage and sink the required current so as to maintain the substrate at an adequate negative bias.

12 Claims, 4 Drawing Figures

SUBSTRATE GENERATOR

FIELD OF THE INVENTION

The invention disclosed broadly relates to the FET circuitry and more particularly relates to a substrate voltage generator on an integrated circuit chip employing FET devices.

BACKGROUND OF THE INVENTION

The motivation to reduce the magnitude of the power supply voltages on integrated FET circuits arises from the attempt to make FET circuits compatible with bipolar TTL circuits which operate at 5 volts instead of 8.5 volts and the use of processing technologies having closer line separations which require lower power supply voltages to avoid voltage induced faults. A complicating factor arises, however, in that the elimination of the 8.5 volt power supply voltage precludes the generation of a negative 5 volt potential for substrates employing the prior art substrate voltage generator circuit.

Prior art substrate voltage generator circuits include that disclosed in U.S. Pat. No. 3,806,741 to Smith, which discloses a conventional substrate voltage generator circuit requiring an 8.5 volt power supply to deliver a minus 5 volt substrate voltage. The use of static load devices such as R1–R6 generates a relatively high power dissipation and the circuit requires a substantial area for its layout on an integrated circuit chip. Since FET integrated circuits normally require a plus 5 volt voltage, the integrated circuit which employs this prior art voltage generator will require three voltages, a plus 8.5, a plus 5 and a ground voltage. If the prior art circuit had its operating input power supply voltage reduced to plus 5 volts, it would not be capable of generating minus 5 volts for the substrate voltage.

OBJECTS OF THE INVENTION

It is therefore an object of the invention to provide an improved substrate voltage generator circuit.

It is still another object of the invention to provide a negative substrate voltage on an integrated circuit chip, generated from a lower positive power supply voltage than was possible in the prior art.

SUMMARY OF THE INVENTION

These and other objects, features and advantages of the invention are accomplished by the substrate voltage generator circuit disclosed herein. An FET substrate voltage generator circuit is disclosed for converting a single power supply and ground potential to a negative potential having an absolute value whose magnitude is greater than the power supply potential and applying that potential to the substrate of an integrated circuit upon which it is formed. The circuit dissipates less power per unit of current supplied by the circuit and occupies less space than do prior art circuits. The circuit applies the principle of voltage doubling to a first capacitor to achieve the desired voltage magnitude across a second capacitor and then applies the principle of a.c. coupling to that second capacitor connected through an impedance to the first capacitor, to achieve the desired polarity inversion for the substrate voltage to be generated. This circuit provides the current generating capacity necessary to drive the substrate to a negative voltage and sink the required current so as to maintain the substrate at an adequate negative bias.

DESCRIPTION OF THE FIGURES

These and other objects, features and advantages of the invention will be more fully appreciated with reference to the accompanying figures.

DISCUSSION OF THE PREFERRED EMBODIMENT

An FET substrate voltage generator circuit is disclosed for converting a single power supply and ground potential to a negative potential having an absolute value whose magnitude is greater than the power supply potential and applying that potential to the substrate of an integrated circuit upon which it is formed, a result which has not been achieved in the prior art. In addition, the circuit dissipates less power per unit of current supplied by the circuit and occupies less space than do prior art circuits. The circuit applies the principle of voltage doubling to a first capacitor to achieve the desired voltage magnitude across a second capacitor and then applies the principle of a.c. coupling to that second capacitor connected through an impedance to the first capacitor, to achieve the desired polarity inversion for the substrate voltage to be generated. This circuit will provide the current generating capacity necessary to drive the substrate negative and sink the required current so as to maintain the substrate at an adequate negative bias.

The subject substrate voltage generator circuit disclosed herein is capable of generating a minus 5 volt substrate voltage from a plus 5 volt power supply voltage and ground voltage. The subject circuit will sink significant quantities of current from the substrate without dissipating excessive power and occupies a substantially smaller area than do prior art substrate voltage generator circuits.

Figure 1:
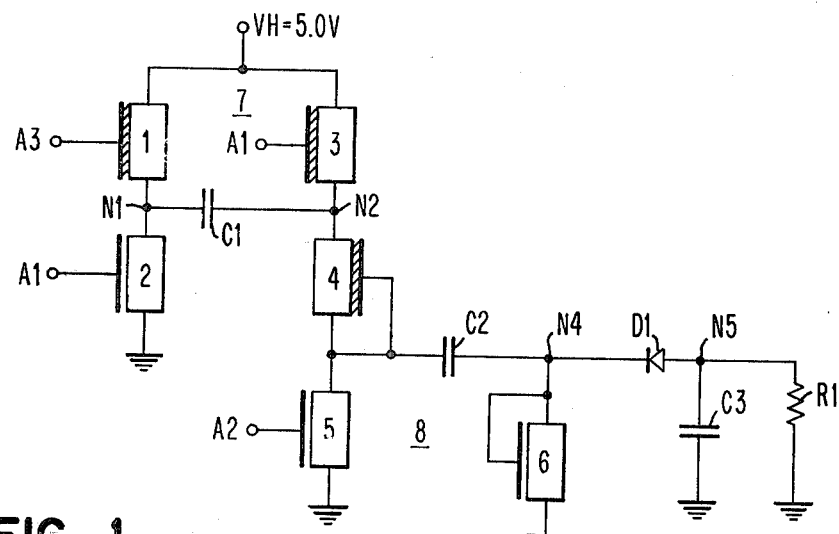
FIG. 1 is a circuit schematic diagram of the substrate voltage generator circuit.

FIG. 1 shows the substrate voltage generator circuit which is connected between the power supply voltage $V_H$ of 5 volts and ground voltage. The substrate voltage generator circuit is formed on an integrated circuit semiconductor substrate and provides the biasing potential to that substrate, as represented by the capacitor C3. R1 represents the substrate leakage path to ground.

A first impedance device 1 is connected between the power supply voltage $V_H$ and a first node N1. First FET device 2 is connected between the first node N1 and ground voltage, and has a gate connected to a first periodic voltage pulse A1.

A second FET device 3 is connected between the power supply voltage $V_H$ and a second node N2, and has a gate connected to the first periodic voltage pulse A1. A first capacitor C1 is connected between the first node N1 and the second node N2. The first FET device 2, the second FET device 3 and the first capacitor C1 operate in response to the first periodic voltage pulse A1 to produce a high voltage at the second node N2, having a magnitude which is approximately twice the difference between the power supply voltage $V_H$ and ground voltage.

A second impedance device 4 is connected between the second node N2 and the third node N3. A third FET device 5 is connected between the third node N3 and the ground voltage, having its gate connected to a second periodic voltage pulse A2 which rises to an on-state voltage after the first periodic voltage pulse A1 falls to an off-state voltage.

A first uni-directional current conducting means such as the self-biased FET 6 is connected between a fourth node N4 and ground voltage and is poled to conduct current to the ground voltage. A second capacitor C2 has a capacitance which is less than the capacitance of the first capacitor C1 and is connected between the third node N3 and the fourth node N4. The first uni-directional current conducting means 6 discharges the second capacitor C2 when the third node N3 rises in voltage in response to the voltage at the second node N2.

A second uni-directional current conducting means such as the diode D1 is connected between the fourth node N4 and the substrate node N5 and is poled to conduct current out of the substrate. The second uni-directional current conducting means D1 conducts current from the substrate in response to a reduction in voltage at the fourth node N4 in response to the second periodic voltage pulse A2, turning on the third FET device 5. In this manner, a negative substrate voltage is produced at the substrate node N5, having an absolute value greater in magnitude than is the magnitude of the power supply voltage $V_H$.

Figure 2:
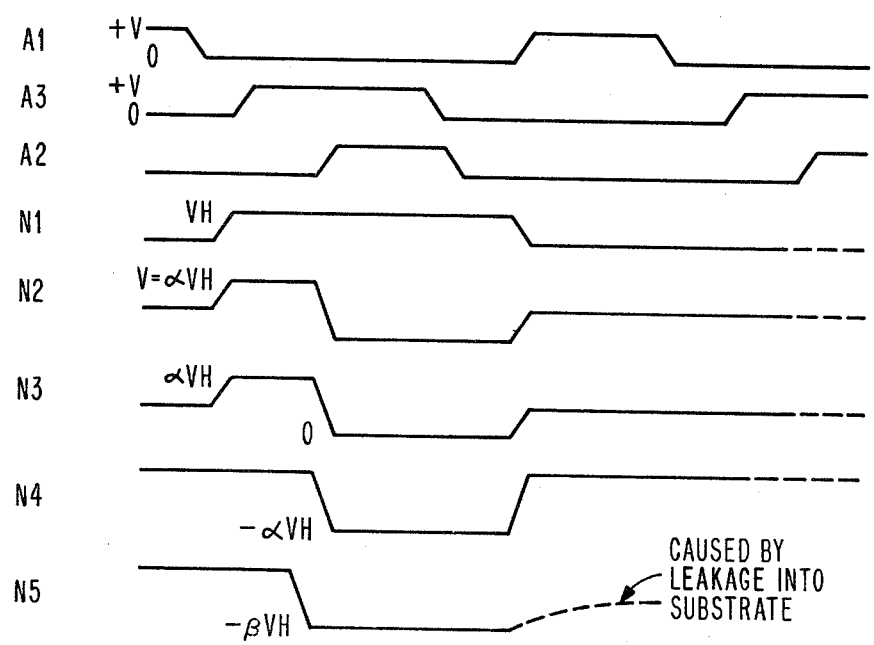
FIG. 2 is a series of waveform diagrams for the voltages achieved at various nodes in the circuit shown in FIG. 1, with the output node N5 in the steady state.

The first impedance device 1 may be a depletion mode FET device having a gate connected to a third periodic voltage pulse A3 whose voltage rises to an on-state voltage after the second periodic voltage pulse A2 rises to an on-state voltage. The respective waveforms for the voltage pulses A1, A2, and A3 may be compared in FIG. 2.

The second FET device 3 may be a depletion mode FET device. Its operation in the circuit is to be in a conductive state during the period when the voltage pulse A1 is in its on-state and to go into a nonconducting state when the first voltage pulse A1 goes into its off-state and the second node N2 attains a relatively high voltage. This comes about because the source potential for the device 3 rises to higher potential than is the off-state voltage for the waveform A1.

The second impedance device 4 may be a depletion mode FET device having its gate connected to the third node N3.

The first uni-directional current conducting means 6 may be an enhancement mode FET device having its gate connected to the fourth node N4.

The second uni-directional current conducting means D1 may be a PN junction diode.

The operation of the substrate voltage generator circuit is as follows. The capacitor C3 is the substrate equivalent capacitance. When the voltage at node N3 is high, it is at a magnitude of $\alpha \times V_H$ where $\alpha$ is equal to the quantity $[1+C1/(C1+C2)]$. This is due to the voltage doubling effect of the capacitor C1 between the nodes N1 and N2. When the voltage at node N3 is high, the voltage at node N4 is clamped by FET 6 so as to be at less than one threshold voltage $V_{TH}$ of the FET device 6 above ground potential and the substrate voltage is less than zero. As the voltage at node N3 changes from $\alpha V_H$ to 0 or ground voltage when the FET device 5 turns on, the change in the voltage at node N4 follows the downward change in the voltage at node N3 until the diode D1 turns on. The diode D1 will reach its turn-on state when the voltage at node N4 changes by the magnitude $V_{TH}$ minus the substrate voltage $V_S$ (assuming that the threshold voltage of the diode D1 is negligible, for the purposes of approximation). As the voltage at node N3 continues to change, the voltage at node N4 will change based on the capacitive redistribution of charge between the capacitors C2 and C3 so that the change in the voltage at node N4 equals the change in the voltage at node N3 times the ratio $\beta$ which equals $C2/(C2+C3)$. Therefore, in each cycle of the circuit, the change in the threshold voltage will equal the quantity $[\alpha V_H - (V_{TH} - V_S)][C2/(C2+C3)]$. Thus, the substrate voltage $V_S$ will continue to decrease until the current transferred by the substrate generator circuit over a given cycle exactly offsets the current leakage from the substrate to the ground potential through the leakage resistor $R_1$.

Figure 3:
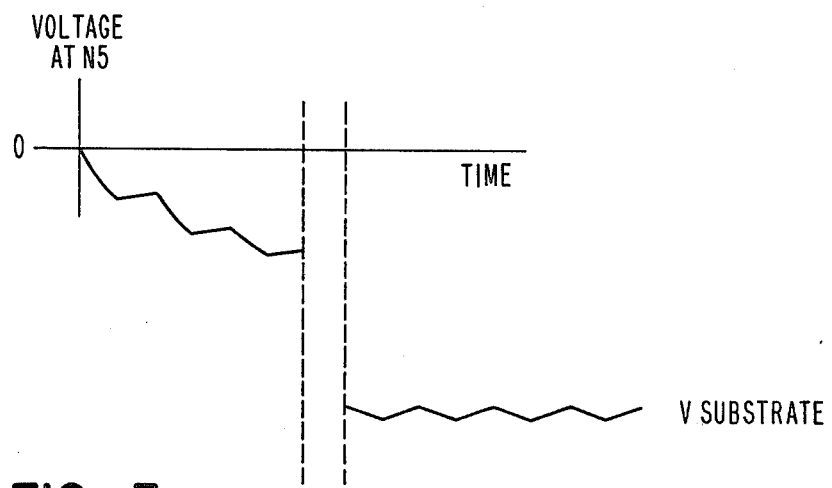
FIG. 3 shows the start up waveform at the output node N5 over many cycles.

Initially the substrate is at ground potential. With each cycle of the substrate generator circuit, current is passed from the substrate through device D1, thereby lowering the substrate voltage. As the substrate voltage lowers, less current passes through D1, until in the steady state, the current passed through D1 to the substrate generator circuit just compensates for the leakage current through R1 from the substrate to ground potential, as shown in FIG. 3.

The resulting substrate generator circuit is capable of generating a minus 5 volt substrate voltage from a plus 5 volt $\pm 10\%$ power supply voltage and ground voltage. The subject circuit will sink significant quantities of current from the substrate without dissipating excessive power and occupies a substantially smaller area than do prior art substrate voltage generator circuits. There are no static loads in the subject circuit, as there are in the prior art circuits, and there is, therefore, a substantial reduction in the power dissipation for the subject circuit.

Figure 4:
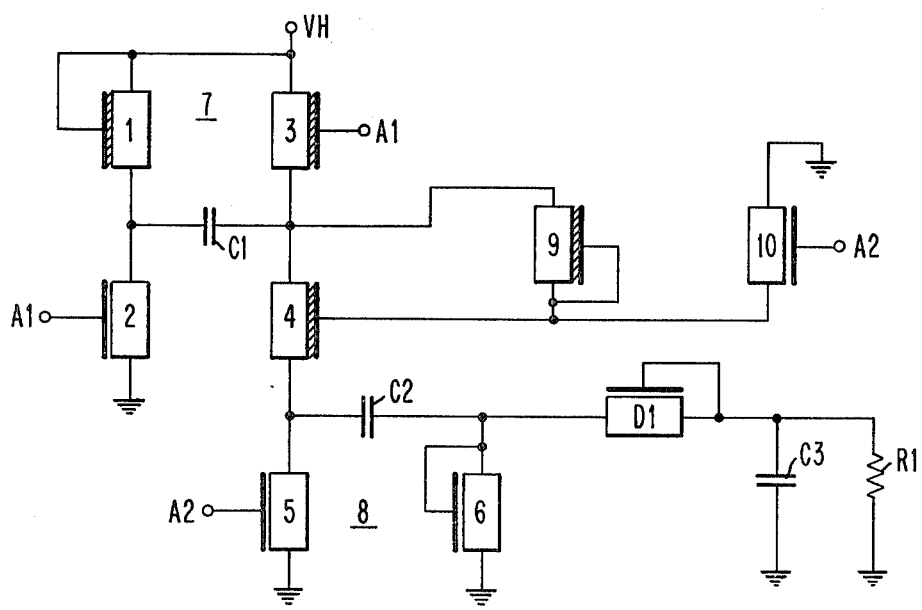
FIG. 4 shows the circuit diagram of an alternate embodiment of the invention.

FIG. 4 shows an alternate embodiment which adds devices 9 and 10 to the circuit of FIG. 1, which isolate the voltage doubler circuit 7 comprising devices 1, 2, and 3 and C1 from the negative voltage generator circuit 8 which comprises devices 5 and 6 and D1, C2, and C3. The timing waveform A2 performs an isolating function by turning off device 4 after the drain of device 5 charges to approximately $2V_H$. It then allows the doubler to go through a cycle while the negative generator 8 supplies current to the substrate. As a result, the fundamental cycle time for the substrate generator function can be decreased, resulting in a corresponding increase of the charge per unit time which can be passed to the substrate generator from the substrate.

While the invention has been particularly shown and described with reference to the preferred embodiments thereof, it will be understood by those skilled in the art that the foregoing and other changes in form and details may be made therein without departing from the spirit and the scope of the invention.

Having thus described our invention, what we claim as new, and desire to secure by Letters Patent is:

1. In an integrated circuit on a semiconductor substrate, a substrate voltage generator connected between a power supply voltage and the ground voltage, comprising:

a first impedance device connected between said power supply voltage and a first node;

a first FET device connected between said first node and said ground voltage, having a gate connected to a first periodic voltage pulse;

a second FET device connected between said power supply voltage and a second node, having a gate connected to said first periodic voltage pulse;

a first capacitor connected between said first and second nodes;

said first and second FET devices and said first capacitor operating in response to said first periodic voltage pulse to produce a high voltage at said second node having a magnitude which is approximately twice the difference between said power supply voltage and said ground voltage;

a second impedance device connected between said second node and a third node;

a third FET device connected between said third node and said ground voltage, having a gate connected to a second periodic voltage pulse which rises to an on-state voltage after said first periodic voltage pulse falls to an off-state voltage;

a first uni-directional current conducting means connected between a fourth node and said ground voltage, poled to conduct current to said ground voltage;

a second capacitor having a capacitance less than said first capacitor's capacitance, connected between said third and fourth nodes;

said first uni-directional current conducting means discharging said second capacitor when said third node rises in voltage in response to said voltage at said second node;

a second uni-directional current conducting means connected between said fourth node and said substrate, poled to conduct current out of said substrate;

said second uni-directional current conducting means conducting current from said substrate in response to a reduction in voltage at said fourth node in response to said second periodic voltage pulse turning on said third FET device;

whereby a negative substrate voltage is produced having an absolute value greater in magnitude than is the magnitude of said power supply voltage.

2. The circuit of claim 1, wherein said first impedance device is an FET having a gate connected to a third periodic voltage pulse whose voltage rises to an on-state voltage after said second periodic voltage pulse rises to an on-state voltage.

3. The circuit of claim 2, wherein said FET serving as said first impedance device is a depletion mode FET.

4. The circuit of claim 3, wherein said second FET device is a depletion mode FET device.

5. The circuit of claim 4, wherein said second impedance device is a depletion mode FET device having its gate connected to said third node.

6. The circuit of claim 5, wherein said first uni-directional current conducting means is an enhancement mode FET device having its gate connected to said fourth node.

7. The circuit of claim 6, wherein said second uni-directional current conducting means is a P-N junction diode.

8. The circuit of claim 1, wherein said second FET device is a depletion mode FET device.

9. The circuit of claim 8, wherein said second FET device goes into a non-conducting state when said first voltage pulse is low and said second node attains said relatively high voltage.

10. The circuit of claim 1, wherein said second impedance device is a depletion mode FET device having its gate connected to said third node.

11. The circuit of claim 1, wherein said first uni-directional current conducting means is an enhancement mode FET device having its gate connected to said fourth node.

12. The circuit of claim 1, wherein said second uni-directional current conducting means is a P-N junction diode.

* * * * *